(12) United States Patent
Liu et al.

(10) Patent No.: US 11,304,062 B2
(45) Date of Patent: Apr. 12, 2022

(54) SYSTEM AND METHOD FOR DETERMINING LAYOUT OF WIRELESS COMMUNICATION NETWORK

(71) Applicant: City University of Hong Kong, Kowloon (HK)

(72) Inventors: Jianqing Liu, Kowloon (HK); Wing Ming Eric Wong, Kowloon (HK)

(73) Assignee: City University of Hong Kong, Kowloon (HK)

(*) Notice: Subject to any disclaimer, the term of this patent is extended or adjusted under 35 U.S.C. 154(b) by 0 days.

(21) Appl. No.: 16/879,893

(22) Filed: May 21, 2020

(65) Prior Publication Data
US 2021/0368355 A1 Nov. 25, 2021

(51) Int. Cl.
*H04W 4/02* (2018.01)
*H04W 16/18* (2009.01)

(52) U.S. Cl.
CPC .................... *H04W 16/18* (2013.01)

(58) Field of Classification Search
CPC .... H04W 16/38; H04W 4/025; H04W 56/003
See application file for complete search history.

(56) References Cited

U.S. PATENT DOCUMENTS

| 2015/0338522 A1* | 11/2015 | Miller | G01S 19/22 342/357.61 |
| 2020/0092732 A1* | 3/2020 | Raj | H04W 24/08 |

* cited by examiner

*Primary Examiner* — Michael T Vu
(74) *Attorney, Agent, or Firm* — Renner Kenner Greive Bobak Taylor & Weber

(57) ABSTRACT

A system and method for determining a layout of a wireless communication network in a terrain. The wireless communication network includes multiple wireless communication devices each arranged to communicate wirelessly with one or more external communication devices. The method includes obtaining a modelled terrain of the terrain in which the wireless communication devices of the wireless communication network can be arranged. The modelled terrain includes a first type of area in which external communication devices can be located, and a second type of area representing obstacles arranged to affect communication between the wireless communication devices and the external communication device. The method also includes determining, based on a criteria, respective installation locations of the wireless communication devices in the modelled terrain so as to determine a layout of the wireless communication network in the terrain.

24 Claims, 7 Drawing Sheets

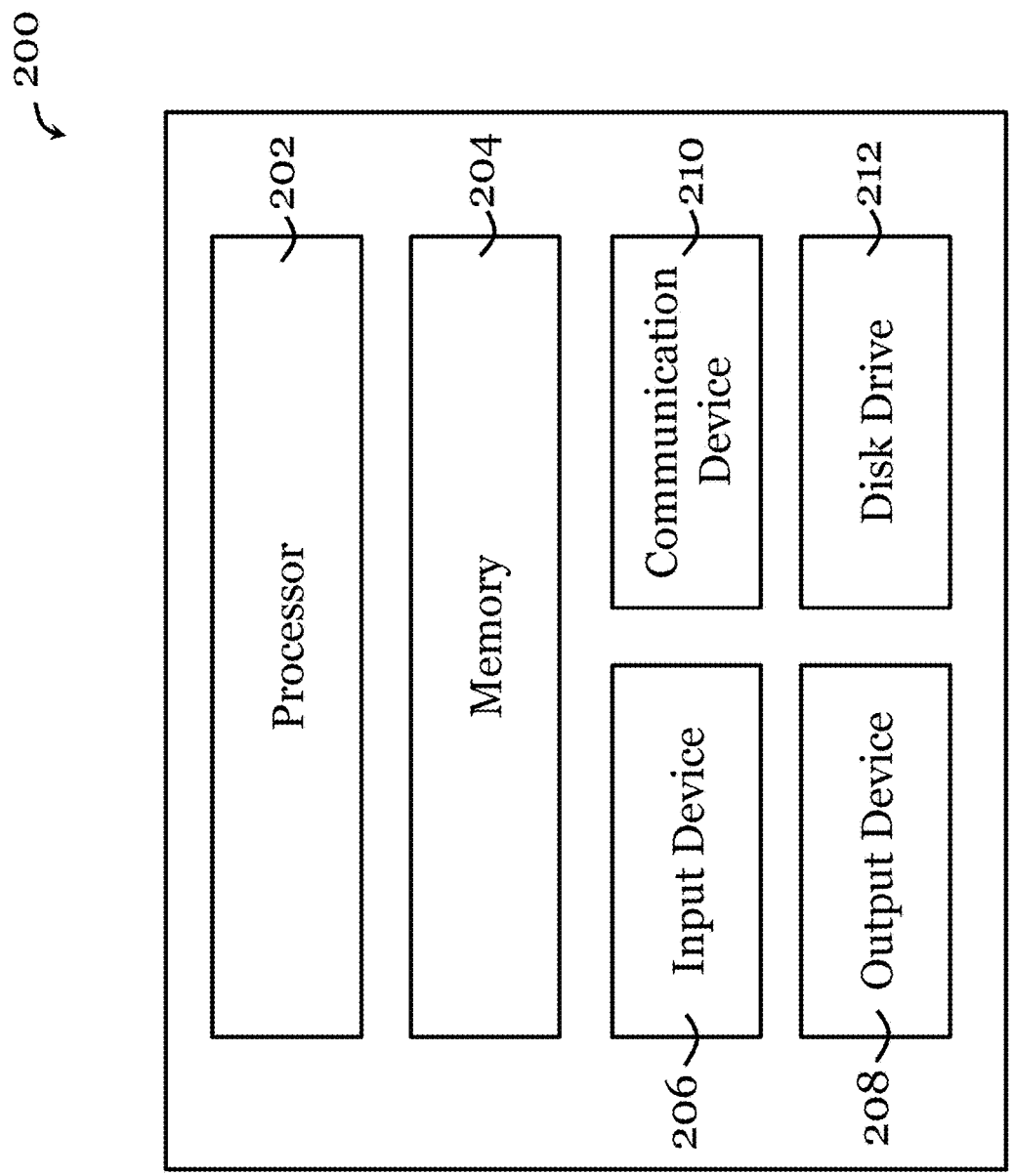

SYSTEM AND METHOD FOR DETERMINING LAYOUT OF WIRELESS COMMUNICATION NETWORK

TECHNICAL FIELD

The invention relates to systems and methods for determining a layout of a wireless communication network.

BACKGROUND

A wireless communication network is generally formed by multiple wireless communication devices each arranged to communicate wirelessly with one or more external communication devices. To ensure proper communication coverage in an area (or terrain), the installation or deployment locations of the wireless communication devices have to determined carefully, taking into account operation efficiency and costs.

One type of wireless communication network is the millimeter-wave (mmWave) communication network. S. Rajagopal, S. Abu-Surra, and M. Malmirchegini, "*Channel Feasibility for Outdoor Non-Line-of-Sight MmWave Mobile Communication*", 2012 *IEEE Vehicular Technology Conference*, pp. 1-6, September 2012 has shown that mmWave communication links in urban terrain are dominated by direct line-of-sight communication links and first-order reflection communication links. mmWave communication network usually requires large arrays of mmWave communication devices (e.g., base stations) to generate narrow and directional beams, in order to overcome the orders-of-magnitude high path loss found in mmWave spectrum. Problematically, however, directional narrow beams are prone to be blocked by obstacles in the area (obstacles such as walls and vehicles in an outdoor urban terrain). Blockage of the beams will lead to communication link outage, or disruption, which is frustrating for the users of the external communication devices.

To date, outage in the mmWave networks are handled by two different approaches. The first approach leverages the first-order reflection of the communication paths (e.g., reflected by an obstacle). When the direct line-of-sight communication path is blocked, the serving base station can steer the beam along with a reflection path to recover the connection. The connectivities of the direct line-of-sight and reflection paths are closely related with the locations of base stations, the users (the external communication devices), and the terrain. The second approach uses the macro diversity to ensure that each user is covered by multiple mmWave base stations. In such case, if the mmWave signals from one base station are blocked, the communication link can be recovered by the signals from another surrounding base station.

A number of methods for determining layout of an mmWave communication network (installation or deployment locations of the mmWave base stations) have been proposed.

M. Gonzalez and J. Thompson, "*An Energy Efficient Base Station Deployment for mmWave Based Wireless Backhaul*", *IEEE 27th Annual International Symposium on Personal, Indoor, and Mobile Radio Communications* (PIMRC); pp. 1-6, September 2016 proposes a greedy algorithm for energy-efficient base station deployment in mmWave heterogeneous networks.

Y. Lu, H. W. Hsu, and L. C. Wang, "*Performance Model and Deployment Strategy for mmWave Multi-Cellular Systems*"; *IEEE 25th Wireless and Optical Communication Conference*, pp. 1-4, May 2016 proposes a heuristic approach that provides direct line-of-sight connectivity in the area.

S. Szyszkowicz, A. Lou, and H. Yanikomeroglu, "*Automated Placement of Individual Millimeter-Wave Wall-Mounted Base Stations for Line-of-Sight Coverage of Outdoor Urban Areas*", *IEEE Wireless Communications Letters*, vol. 5, no. 3, pp. 316-319, June 2016 distributes base stations to determined locations to cover the area.

N. Palizban, S. Szyszkowicz, and H. Yanikomeroglu, "*Automation of Millimeter Wave Network Planning for Outdoor Coverage in Dense Urban Areas Using Wall-Mounted Base Stations*", *IEEE Wireless Communications Letters*, vol. 6, no. 2, pp. 206-209, April 2017 uses the approach in the previous work as its baseline and distributes a fixed number of base stations to maximize the coverage area. The approach in Palizban will be referred to, in the following description as the maximum coverage (MC) deployment technique.

These existing methods fail to take into account, or properly consider, obstacles in the terrain hence their impact on communication integrity and outage. Also, most, if not all, of them focus on solely maximizing the coverage area of direct line-of-sight communication links. Importantly, solely maximizing coverage does not necessarily lead to a low outage, especially for mmWave networks in urban terrain. There is a need to provide an improved, or more generally, an alternative method for determining a layout of a wireless communication network such as the mmWave network, e.g., for urban terrain.

SUMMARY OF THE INVENTION

In accordance with a first aspect of the invention, there is provided a method for determining a layout of a wireless communication network in a terrain. The wireless communication network includes multiple wireless communication devices each arranged to communicate wirelessly with one or more external communication devices. The method includes obtaining a modelled terrain of the terrain, in which the wireless communication devices of the wireless communication network can be arranged. The modelled terrain includes a first type of area in which external communication devices can be located, and a second type of area representing obstacles (area(s) occupied by the obstacles) arranged to affect communication between the wireless communication devices and the external communication device. The method also includes determining, using a processor, based on a criteria, respective installation locations of one or more or all of the wireless communication devices in the modelled terrain so as to determine a layout of the wireless communication network in the terrain. The modelling may include further determination steps. The modelled terrain can be a computer simulation or a computer model of the terrain. The modelled terrain approximates or represents properties of the terrain, e.g., the physical environment. The terrain may be an urban environment in which multiple buildings are arranged. The modelled terrain may be 2D, 2.5D, 3D, or even 4D (considering different time at the same 3D location).

In one embodiment of the first aspect, the method also includes modelling, using the processor, the terrain in which the wireless communication devices of the wireless communication network can be arranged. The modelling includes determining the first type of area in which external communication devices can be located, and determining the second type of area representing obstacles arranged to affect communication between the wireless communication devices and the external communication device.

In one embodiment of the first aspect, modelling the terrain further includes segmenting the first type of area into multiple grids and the criteria is separately applied to each respective grid. The grids may be of substantially the same size. The grids may be rectangular, squared, etc.

In one embodiment of the first aspect, the modelling further includes determining candidate locations suitable for installing the wireless communication devices. Each respective determined installation locations correspond to a respective candidate location. The candidate locations may be determined based on a utility criteria.

In one embodiment of the first aspect, determining respective installation locations of the wireless communication devices includes determining, from the candidate locations and based on the criteria, the candidate locations that best match the criteria.

In one embodiment of the first aspect, the total number of candidate locations is larger than a set total number of wireless communication devices. The set total number can be fixed or it can be adjusted, e.g., by the user via a user input.

In one embodiment of the first aspect, the criteria include a coverage criteria that requires each of the first type of areas to be communicatively covered by a set number of wireless communication devices of the wireless communication network. The set number can be any positive integer. The set number is larger than 1. The set number can be fixed or it can be adjusted, e.g., by the user via a user input. If the set number is adjustable, the method may further include adjusting, by the processor, the set number based on a user input (that contains or indicates the adjusted number).

In one embodiment of the first aspect, the criteria includes an outage-constrained criteria that requires each of the first type of areas to have an outage probability less than a set threshold. The outage represents a loss or lack of communication between the wireless communication network and an external communication device in the terrain. The set threshold can be fixed or it can be adjusted, e.g., by the user via a user input. If the set threshold is adjustable, the method may further include adjusting, by the processor, the set threshold based on a user input (that contains or indicates the adjusted threshold). In one embodiment, this is related to outage-constrained technique.

In one embodiment of the first aspect, the criteria includes the outage-constrained criteria, and determining respective installation locations of the wireless communication devices in the modelled terrain includes determining a minimum number of wireless communication devices required for the outage probability at each of the first type of area to be less than a respective set threshold. In one embodiment, this is related to outage-constrained technique.

In one embodiment of the first aspect, the method further includes selecting, based on a user input and using the processor, from multiple predetermined criteria, a criteria to be used for determining the installation locations. The selection may include selecting two (or more) criteria for use in determining the installation locations.

In one embodiment of the first aspect, the multiple predetermined criteria includes: a coverage criteria that requires each of the first type of areas to be communicatively covered by a set number of wireless communication devices of the wireless communication network; and an outage-constrained criteria that requires each of the first type of areas to have an outage probability less than a set threshold. The outage represents a loss or lack of communication between the wireless communication network and an external communication device in the terrain. The multiple predetermined criteria may further include a cost criteria that sets a cost limit for installing the wireless communication devices.

In one embodiment of the first aspect, each wireless communication device is arranged to communicate with the user device via direct non-reflected communication path(s) and first-order reflection communication path(s). For example, each wireless communication device is arranged to communicate with the user device only via direct non-reflected communication path(s) and first-order reflection communication path(s). In one embodiment of the first aspect, each wireless communication device may be further arranged to communicate with the user device via higher-order reflection communication path(s).

In one embodiment of the first aspect, the method further includes determining (one or more or all possible) direct non-reflected communication paths and (one or more or all possible) first-order reflection communication paths between each of the first type of area and the respectively wireless communication devices communicatively covering respective first type of area. The determined direct non-reflected communication paths and first-order reflection communication paths are used at least in part for determining the installation locations.

In one embodiment of the first aspect, the method further includes displaying, on a display operably connected with the processor, the modelled terrain and indications indicating the determined installation locations on the modelled terrain.

In one embodiment of the first aspect, the wireless communication network is an mmWave communication network and the wireless communication devices are mmWave communication base stations. In one embodiment of the first aspect, the external communication device is a portable electronic device. The portable electronic device may be a smart phone, a smart watch, a smart wearable, an IoT device, a tablet, or the like, which can communicate wirelessly. The wireless communication devices may be able to steer or otherwise change the propagation direction of communication link.

In accordance with a second aspect of the invention, there is provided a method for constructing a wireless communication network in a terrain. The wireless communication network including multiple wireless communication devices each arranged to communicate wirelessly with one or more external communication devices. The method includes determining the layout of a wireless communication network in a terrain using the method of the first aspect, and installing or constructing one or more (e.g., all) wireless communication devices in the terrain based on the determined layout.

In accordance with a third aspect of the invention, there is provided a wireless communication network constructed or installed based on the determined layout determined using the method of the first aspect.

In one embodiment of the third aspect, the wireless communication network is an mmWave communication network and the wireless communication devices are mmWave communication base stations. In one embodiment of the third aspect, the external communication device is a portable electronic device. The portable electronic device may be a smart phone, a smart watch, a smart wearable, an IoT device, a tablet, or the like, which can communicate wirelessly. The wireless communication devices may be able to steer or otherwise change the propagation direction of communication link.

In accordance with a fourth aspect of the invention, there is provided a system for determining a layout of a wireless communication network in a terrain. The wireless communication network comprising multiple wireless communication devices each arranged to communicate wirelessly with one or more external communication devices. The system includes one or more processors arranged to: determine, based on a criteria, respective installation locations of (one or more or all of) the wireless communication devices in a modelled terrain of the terrain so as to determine a layout of the wireless communication network in the terrain. The modelled terrain includes a first type of area in which external communication devices can be located, and a second type of area representing obstacles arranged to affect communication between the wireless communication devices and the external communication device.

In one embodiment of the fourth aspect, the one or more processors are arranged to model the terrain by segmenting the first type of area into multiple grids. the one or more processors are arranged to apply the criteria separately to each respective grid. The grids may be of substantially the same size. The grids may be rectangular, squared, etc.

In one embodiment of the fourth aspect, the one or more processors are arranged to perform the modelling by determining candidate locations suitable for installing the wireless communication devices. Each respective determined installation locations correspond to a respective candidate location. The candidate locations may be determined based on a utility criteria.

In one embodiment of the fourth aspect, the one or more processors are arranged to determine respective installation locations of the wireless communication devices by determining, from the candidate locations and based on the criteria, the candidate locations that best match the criteria.

In one embodiment of the fourth aspect, the total number of candidate locations is larger than a set total number of wireless communication devices. The set total number can be fixed or it can be adjusted, e.g., by the user via a user input received at an input device operably connected with the one or more processors.

In one embodiment of the fourth aspect, the criteria include a coverage criteria that requires each of the first type of areas to be communicatively covered by a set number of wireless communication devices of the wireless communication network. The set number can be any positive integer. The set number is larger than 1. The set number can be fixed or it can be adjusted, e.g., by the user via a user input. If the set number is adjustable, the one or more processors are arranged to adjust the set number based on a user input (that contains or indicates the adjusted number). The user input may be received at an input device operably connected with the one or more processors.

In one embodiment of the fourth aspect, the criteria includes an outage-constrained criteria that requires each of the first type of areas to have an outage probability less than a set threshold. The outage represents a loss or lack of communication between the wireless communication network and an external communication device in the terrain. The set threshold can be fixed or it can be adjusted, e.g., by the user via a user input. If the set threshold is adjustable, the one or more processors are arranged to adjust the set threshold based on a user input (that contains or indicates the adjusted threshold). The user input may be received at an input device operably connected with the one or more processors.

In one embodiment of the fourth aspect, the criteria includes the outage-constrained criteria, and the one or more processors are arranged to determine respective installation locations of the wireless communication devices in the modelled terrain by determining a minimum number of wireless communication devices required for the outage probability at each of the first type of area to be less than a respective set threshold.

In one embodiment of the fourth aspect, the one or more processors are arranged to select, based on a user input received from an input device operably connected with the one or more processors, from multiple predetermined criteria, a criteria to be used for determining the installation locations. The one or more processors are arranged to select two (or more) criteria for use in determining the installation locations.

In one embodiment of the fourth aspect, the multiple predetermined criteria includes: a coverage criteria that requires each of the first type of areas to be communicatively covered by a set number of wireless communication devices of the wireless communication network; and an outage-constrained criteria that requires each of the first type of areas to have an outage probability less than a set threshold. The outage represents a loss or lack of communication between the wireless communication network and an external communication device in the terrain. The multiple predetermined criteria may further include a cost criteria that sets a cost limit for installing the wireless communication devices.

In one embodiment of the fourth aspect, each wireless communication device is arranged to communicate with the user device via direct non-reflected communication path(s) and first-order reflection communication path(s). For example, each wireless communication device is arranged to communicate with the user device only via direct non-reflected communication path(s) and first-order reflection communication path(s). In one embodiment of the fourth aspect, each wireless communication device may be further arranged to communicate with the user device via higher-order reflection communication path(s).

In one embodiment of the fourth aspect, the one or more processors are further arranged to determine (one or more or all possible) direct non-reflected communication paths and (one or more or all possible) first-order reflection communication paths between each of the first type of area and the respectively wireless communication devices communicatively covering respective first type of area. The determined direct non-reflected communication paths and first-order reflection communication paths are used at least in part by the one or more processors for determining the installation locations.

In one embodiment of the fourth aspect, the system further includes a display operably connected with the one or more processors. The display is arranged to display the modelled terrain and indications indicating the determined installation locations on the modelled terrain. The display may be touch-sensitive so that is also acts as an input device for receiving user input.

In one embodiment of the fourth aspect, the wireless communication network is an mmWave communication network and the wireless communication devices are mmWave communication base stations. In one embodiment of the fourth aspect, the external communication device is a portable electronic device. The portable electronic device may be a smart phone, a smart watch, a smart wearable, an IoT device, a tablet, or the like, which can communicate wirelessly.

In accordance with a fifth aspect of the invention, there is provided a non-transitory computer readable medium for storing computer instructions that, when executed by one or more processors, causes the one or more processors to perform the method of the first aspect.

BRIEF DESCRIPTION OF THE DRAWINGS

Embodiments of the invention will now be described, by way of example, with reference to the accompanying drawings in which:

FIG. 6 is a functional block diagram of an information handling system arranged to perform a method for determining a layout of a wireless communication network in one embodiment of the invention.

DETAILED DESCRIPTION

Figure 1A:
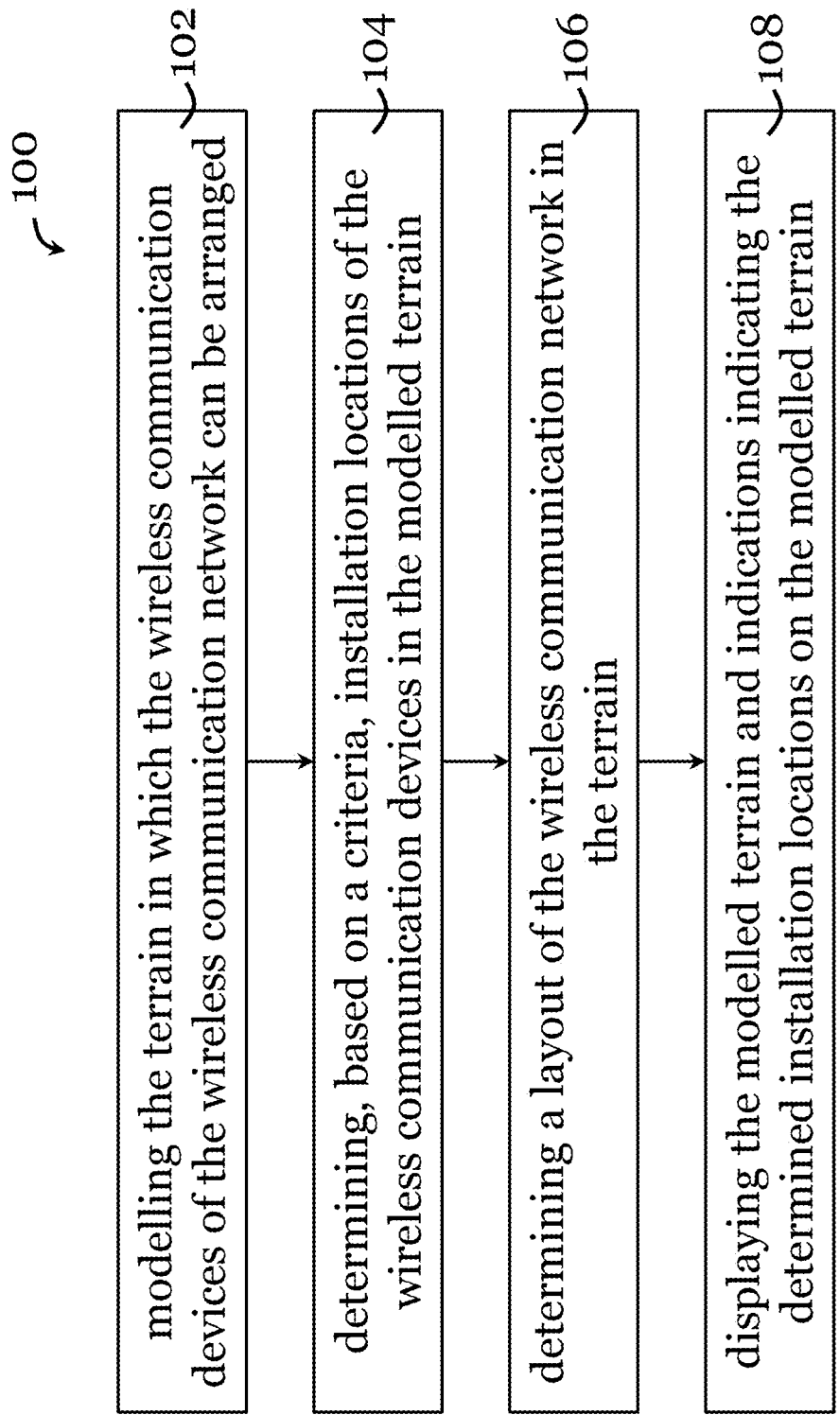
FIG. 1A is a flowchart showing a method for determining a layout of a wireless communication network in one embodiment of the invention.

FIG. 1A shows a method 100 for determining a layout of a wireless communication network in one embodiment of the invention. The wireless communication network includes multiple wireless communication devices each arranged to communicate wirelessly with one or more external communication devices. The wireless communication network may be an mmWave communication network such that the wireless communication devices are mmWave communication base stations. The external communication device can be any portable electronic device such as a smart phone, a smart watch, a smart wearable, an IoT device, a tablet, or the like, which can communicate wirelessly. The wireless communication devices may be able to steer or otherwise change the propagation direction of communication link. In one embodiment, each wireless communication device is arranged to communicate with the user device via direct non-reflected communication path(s) and first-order reflection communication path(s).

The method 100 begins in step 102, in which the terrain in which the wireless communication devices of the wireless communication network can be arranged is modelled, e.g., using a processor. The modelled terrain is a representation of the terrain, e.g., outdoor terrain. The terrain may be an urban environment in which multiple buildings or like obstacles potentially affecting the communication between the wireless communication devices and the external communication devices are arranged. The modelled terrain can be a 2D representation, a 2.5D representation, a 3D representation, or even a 4D representation. The modeling in step 102 includes determining different types of area, including a first type of area in which external communication devices can be located, and a second type of area representing obstacles arranged to affect communication between the wireless communication devices and the external communication device. In one embodiment, modelling the terrain includes segmenting the first type of area into multiple grids and the criteria is separately applied to each respective grid. Modelling may further include determining candidate locations suitable for installing the wireless communication devices. Each respective determined installation locations correspond to a respective candidate location. The candidate locations may be determined based on a utility criteria. The total number of candidate locations may be larger than a set total number of wireless communication devices.

After step 102, the method 100 proceeds to step 104, in which installation locations of the wireless communication devices in the modelled terrain are determined based on a criteria. The criteria may include a coverage criteria that requires each of the first type of areas to be communicatively covered by a set number of wireless communication devices of the wireless communication network. The set number may be adjusted by the user based on needs. In the embodiment in which the set number is adjustable, the method may include adjusting the set number based on a user input (that contains or indicates the adjusted number). The criteria may include an outage-constrained criteria that requires each of the first type of areas to have an outage probability less than a set threshold. The outage represents a loss or lack of communication between the wireless communication network and an external communication device in the terrain. The set threshold may be adjusted by the user based on needs. In the embodiment in which the set threshold is adjustable, the method may include adjusting the set threshold based on a user input (that contains or indicates the adjusted threshold). The criteria may include a cost criteria that sets a cost limit for installing the wireless communication devices. In the embodiment in which the candidate locations are used, the method 100 includes determining, from the candidate locations and based on the criteria, the candidate locations that best match the criteria.

In the embodiment in which the criteria includes the outage-constrained criteria, determining respective installation locations of the wireless communication devices in the modelled terrain includes determining a minimum number of wireless communication devices required for the outage probability at each of the first type of area to be less than a respective set threshold.

Although not illustrated, in some embodiments, the method may further include determining (one or more or all possible) direct non-reflected communication paths and (one or more or all possible) first-order reflection communication paths between each of the first type of area and the respectively wireless communication devices communicatively covering respective first type of area. The determined direct non-reflected communication paths and first-order reflection communication paths are used at least in part for determining the installation locations.

Upon determining the installation locations in step 104, the method 100 in step 106, determines a layout of the wireless communication network in the terrain based on the determination in step 104.

After the layer is determined, in step 108, the method 100 includes displaying the modelled terrain and indications indicating the determined installation locations on the modelled terrain.

Figure 1B:
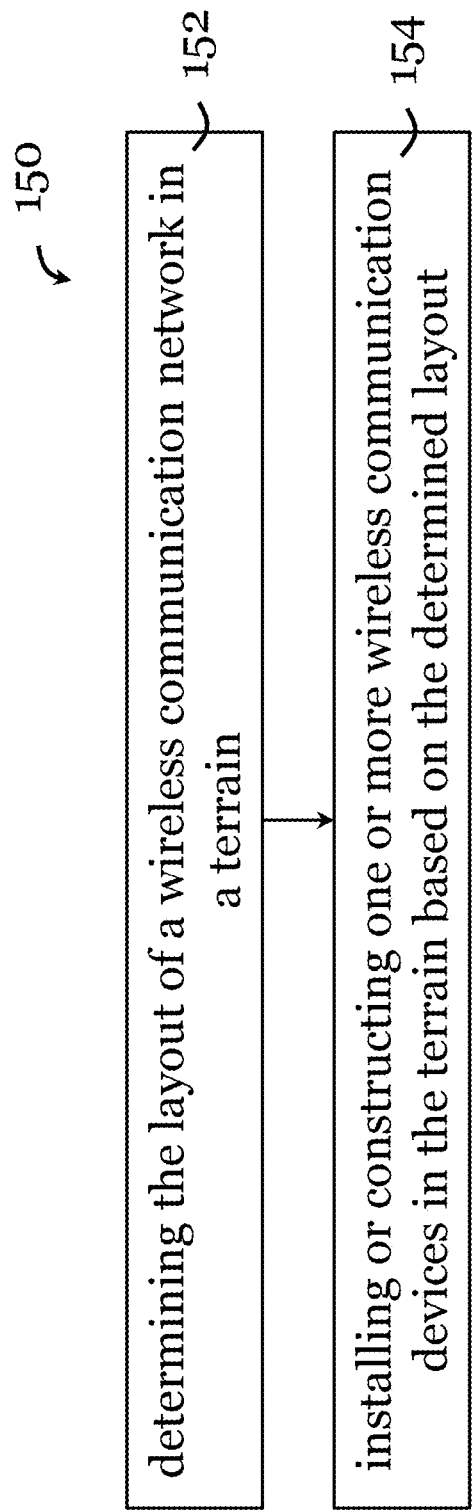
FIG. 1B is a flowchart showing a method for constructing a wireless communication network in a terrain in one embodiment of the invention.

FIG. 1B shows a method 150 for constructing a wireless communication network in a terrain in one embodiment of the invention. Method 150 begins with step 152, in which a layout of a wireless communication network in a terrain is determined. The determination of the layout may be based on the method 100 of FIG. 1. After the layout is determined, in step 154, the wireless communication devices are installed or deployed in the terrain based on the determined layout.

The following description provides a specific embodiment of a method for determining a layout of a wireless communication network, in which the wireless communication network is an mmWave communication network (with multiple mmWave base stations).

This embodiment includes two approaches (may also be referred to as techniques, methods, constrains, etc.). The first approach seeks to minimize the number of deployed or to-be-deployed base stations under the minimum macro diversity order d (d>0) constraint such that each area in which the user device can be present (user position) is covered by, at least, d base stations. This first approach is referred to in the following description as macro diversity-constrained (MDC) deployment technique. The macro diversity-constrained provides a straightforward means to mitigate the outage. Nevertheless, it does not provide an outage performance guarantee at each user position. The second approach seeks to minimize the number of deployed base stations subject to the outrage constraint so that the outage at each area in which the user device can be present (user position) is less than a set threshold. This second approach is referred to in the following description as outage-constrained (OC) deployment technique.

Both the macro diversity order d in the macro diversity-constrained deployment technique and the outage threshold in the outage-constrained deployment technique may be adjusted. This allows different trade-offs between the number of base stations (i.e., the cost) and the outage performance be obtained. In this embodiment the mmWave communication channel propagation is modeled by using ray tracing in the presence of direct line-of-sight and first-order reflection communication paths.

The macro diversity-constrained deployment technique and the outage-constrained deployment technique can be formulated as combinatorial optimization problems.

Figure 2:
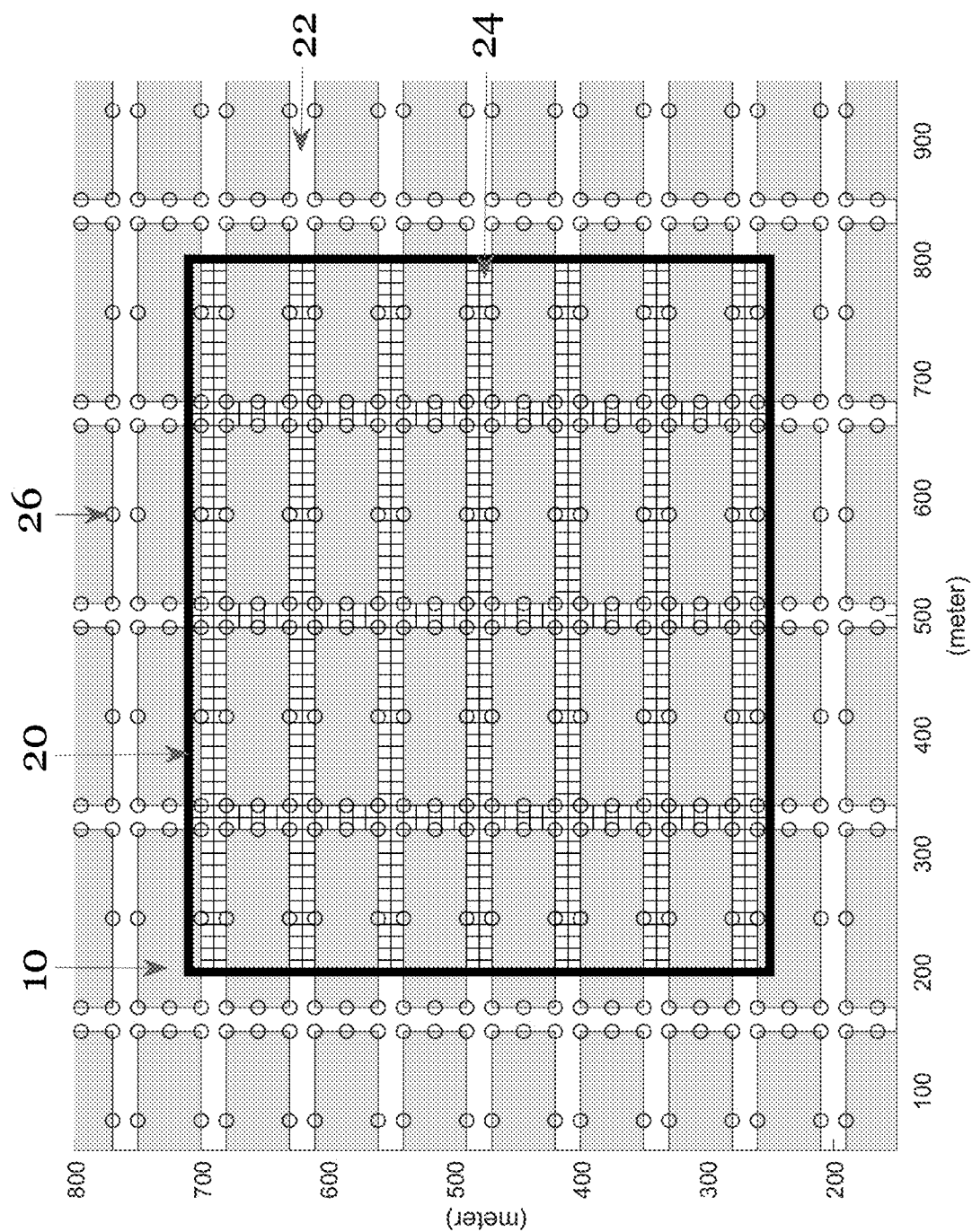
FIG. 2 is a schematic of a modelled terrain in one embodiment of the invention.

Consider a problem of deploying base stations in a terrain. The terrain may be modelled by a processor (one or more processors) as a 3D Manhattan-type geometry. FIG. 2 shows a top view of the geometry. As shown in FIG. 2, the geometry consists of multiple blocks 10 (i.e., buildings) and streets. The circles 26 in FIG. 2 represent candidate base station locations at the height of 5 m, which are the corners and side-middle points of each block 10. These candidate locations can be determined based on the computational geometric method in S. Szyszkowicz, A. Lou, and H. Yanikomeroglu, "*Automated Placement of Individual Millimeter-Wave Wall-Mounted Base Stations for Line-of-Sight Coverage of Outdoor Urban Areas*", IEEE Wireless Communications Letters, vol. 5, no. 3, pp. 316-319, June 2016, which maximizes utility. The following focuses on base station deployment to serve users (user devices) distributed in the Area of Interest 20 outlined by the rectangle in FIG. 2. The streets 22 in the Area of Interest are divided into numerous grids 24, formed by equidistant horizontal and vertical lines. Each grid 24 can be represented by its center coordinates. This embodiment, without loss of generality, assumes that users (user devices) located in the same grid 24 experiences the same communication link status. That means if the communication link between a base station and the center of a grid 24 is in outage (communication lost), all users (user devices) in this grid will experience outage. The sizes of the Manhattan-type geometry and the Area of Interest 20 in FIG. 2 are specified in Table I. As seen from Table I, the total number of grids in the Area of Interest 20 is given by N=1032, and the total number of candidate base station locations in FIG. 2 is B=588.

TABLE I

Sizes of the geometry in FIG. 2

| Parameters | Sizes |
| --- | --- |
| Manhattan-type geometry | 1000 m × 1000 m × 1000 m |
| Block 10 | 150 m × 50 m × 12 m |
| Street 22 width | 20 m each |
| Area of Interest 20 | 600 m × 460 m |
| Grid 24 | 10 m × 10 m each |

Ray tracing, as described in D. Steinmetzer, J. Classen, and M. Hollick, "*MmTrace: Modeling millimeter-wave indoor propagation with image-based ray-tracing*"; 2016 IEEE Conference on Computer Communications Workshops (*IN-FOCOM WKSHPS*), pp. 429-434, April 2016, can be applied to find the line-of-sight and first-order reflection paths in FIG. 2, which connect the i-th candidate base station location (i=1, . . . , B) and the center of the j-th grid (j=1, . . . , N). Without loss of generality, in the example, assume that the maximum link distance between the i-th candidate base station location and the j-th grid for both the line-of-sight and reflection paths is $r_{max}$=200 m. The signal strengths (e.g., received) for the communication paths with lengths larger than $r_{max}$ may become weak and negligible (not enough for communication purpose). Here, the line-of-sight path is the line segment between the i-th candidate base station location and the center of the j-th grid. The reflection path is generated based on the specular reflection theory in which the angle of reflection is equal to the angle of incident.

Define a column vector $y_\epsilon \in \mathbb{Z}^B$ R as the base station deployment indicator, i.e., when a base station is installed at the i-th candidate location, the i-th element of y, $y_i$, is equal to 1, otherwise $y_i$=0. Hence, base station deployment in this embodiment refers to the procedure to determine y to satisfy a certain criterion.

The following provides two different criteria in one embodiment of the invention for distributing base stations in a subset of candidate base station locations in FIG. 2.

The first criteria corresponds to the Macro Diversity-Constrained (MDC) Technique. The macro diversity-constrained base station deployment finds the minimum number of the candidate base station locations in FIG. 2 that guarantee each grid 24 to be covered by at least d base stations, where d is the macro diversity order. The macro diversity-constrained base station deployment problem can be formulated as $$\min_y \sum_{i=1}^{B} y_i \quad (1)$$

-continued subject to $\sum_{i=1}^{B} y_i m_{ij} \geq d$, $j = 1, ..., N$, $y_i \in \{0, 1\}$   $i = 1, ..., B$.

where $m_{ij} \in \{0,1\}$ is the coverage indicator. The coverage indicator is determined according to the result of ray tracing such that $m_{ij}=1$ if there exist line-of-sight or first-order reflection paths between the i-th candidate base station location and j-th grid, and otherwise $m_{ij}=0$. Setting d=1 in equation (1) yields the minimum number of base station development required for covering the whole area. Macro diversity is obtained when d>1. It is intuitive to conclude that the larger the macro diversity order d, the less the link outage is. The optimization problem in equation (1) is a binary integer linear programming and can be optimally solved by using a Branch-and-bound algorithm. An exemplary Branch-and-bound algorithm is disclosed in H. Tuy, M. Minoux, and N. T. Hoai-Phuong, "*Discrete monotonic optimization with application to a discrete location problem*", SIAM Journal on Optimization, vol. 17, no. 1, pp. 7897, 2006.

The constraint in equation (1) can be viewed as a hard coverage constraint. In the perspective of user outage mitigation, it may not be the best to require all the grids to be covered by a certain number (i.e. d) of base stations. This is because the blockage rate of some communication links, such as mmWave communication link, is proportional to the propagation distance. Users (user devices) close to base stations experience lower outage.

The second criteria corresponds to the Outage-Constrained (OC) Technique. This approach does not rely on the hard coverage constraint, but rather, incorporates a soft coverage constraint.

The outage-constrained base station deployment technique directly imposes link outage constraint on the each grid. In this technique the link outage probability of mmWave networks is modelled.

In respect of Link Outage Probability, in mmWave networks, propagation paths between users (user devices) and base stations may be blocked by random obstacles (e.g., vehicles) on the streets. Link outage occurs when all of the line-of-sight and first-order reflection paths between the user and its nearby base stations are blocked. For the link from the i-th candidate base station location to the j-th grid (i.e., the link ij), its outage probability $p_{ij}$ is written as $$p_{ij} = \sum_{k=0}^{K_{ij}} p_{ij}^{(k)}, \quad (2)$$

where $p_{ij}^{(0)}$ is the blockage probability of the line-of-sight path, $p_{ij}^{(k)}$, $k=1, \ldots, K_{ij}$, is the blockage probability of the k-th first-order reflection path in the link ij, and $K_{ij}$ is the total number of first-order reflection paths in the link ij. Without loss of generality this example assumes that the blockages of the line-of-sight and $K_{ij}$ reflection paths are mutually independent (especially true when the numbers of reflection paths and obstacles are relatively small).

Closed-form expressions of $\{p_{ij}^{(k)}\}$ are of interest. Without loss of generality assume that the random rectangular obstacles on the streets with density $\lambda$. Let $\bar{l}$, $\bar{w}$, and $\bar{h}$ denote the average length, width, and height of rectangles, respectively. According to Theorem 1 in T. Bai, R. Vaze, and R. W. Heath, "*Analysis of Blockage Effects on Urban Cellular Networks*" IEEE Trans. on Wireless Communications, vol. 13, no. 9, pp. 5070-5083, September 2014, the line-of-sight blockage probability can be expressed as $$p_{ij}^{(0)} = 1 - e^{-\beta R_{ij}^{(0)} - \alpha}, \quad (3)$$

where $R_{ij}^{(0)}$ is the length of the line-of-sight path, $\alpha = \lambda \bar{l} \bar{w}$, and $$\beta = \frac{2\lambda \bar{h}(\bar{l} + \bar{w})}{\pi}.$$

It should be noted that a first-order reflection path is composed of two line-of-sight segments, one from the candidate base station location to the reflection point and the other from the reflection point to the grid. This reflection path is blocked when any of the two line-of-sight segments is blocked. Under the assumption that the blockage of each line-of-sight segment is independent, the blockage probability of the k-th reflection path can tractably be approximated, based on (3), as $$p_{ij}^{(k)} = 1 - e^{-\beta(R_{ij}^{(k,1)} + R_{ij}^{(k,2)}) - 2\alpha}, k = 1, ..., K_{ij}, \quad (4)$$

where $R_{ij}^{(k,1)}$ and $R_{ij}^{(k,2)}$ are the length of the two line-of-sight segments, respectively. The approximation in equation (4) is particularly accurate when the sizes of the obstacles on the streets are small and/or the intersection angle between the two line-of-sight segments is large.

Provided $p_{ij}$ in equation (2) and the base station deployment indicator vector y, the link outage probability of a user at the j-th grid as $\hat{p}_j$ can be defined as:

$$\hat{p}_j = \Pi_{i=0}^{B} p_{ij}^{y_i}, \quad (5)$$

In this example, the outage-constrained base station deployment criteria is used. This criteria minimizes the number of deployed base stations subject to the link outage constraint at each grid. The outage-constrained base station deployment problem can then be formulated as $$\min_y \sum_{i=1}^{B} y_i \quad (6)$$

subject to  $\hat{p}_j \geq \varepsilon_j$, $j = 1, ..., N$, $y_i \in \{0, 1\}$   $i = 1, ..., B$.

The inequality constraints in equation (6) ensure that the link outage probability of a user in the j-th grid is less than the threshold $\varepsilon_j$ ($0 \leq \varepsilon_j \leq 1$). This optimization problem is a binary integer non-linear programming due to the coupled parameters in equation (5). However, since $\hat{p}_j$ in equation (5) is a monomial, i.e., $\hat{p}_j = p_{1j}^{y_1} \ldots p_{Bj}^{y_B}$, it can be transformed to a linear constraint by taking logarithms on both sides of constraints in equation (6) as $$y^T \vec{a}_j \leq \log \varepsilon_j, \quad (7)$$

where $y^T$ is the transpose of y, and $\vec{a}_j \in \mathbb{R}^B$ is a column vector with the i-th entry $a_{ij} = \log p_{ij}$, i=1, . . . , B. Substituting the constraints in equation (6) with equation (7), the outage-constrained problem becomes a binary integer linear programming and is optimally solved by using the same approach as the macro diversity-constrained technique in equation (1).

Simulations have been performed to evaluate the performance of the above two techniques and to compare their performance with the maximum coverage (MC) deployment technique in N. Palizban, S. Szyszkowicz, and H. Yanikomeroglu, "*Automation of Millimeter Wave Network Planning for Outdoor Coverage in Dense Urban Areas Using Wall-Mounted Base Stations*", IEEE Wireless Communications Letters, vol. 6, no. 2, pp. 206-209, April 2017.

Specifically, the outage performance of the macro diversity-constrained and outage-constrained base station deployment techniques have been evaluated numerically. In the simulation, without loss of generality, 1200 users (user devices) are uniformly distributed on the streets 22 in the Area of Interest 20 in FIG. 2 and their outage statistics are collected for comparison. Assume that the density $\lambda$, average length $\bar{l}$, average width $\bar{w}$, and average height $\bar{h}$ of obstacles on the streets are 0.01 per m², 4 m, 1 m and 2.75 m, respectively. Then, $\alpha$ and $\beta$ in equation (3) and equation (4) are given by 0.04 and 0.0875, respectively. For simplicity, $\{\varepsilon_j\}$ in equation (6) for different j are set to $\varepsilon$.

Figure 3:
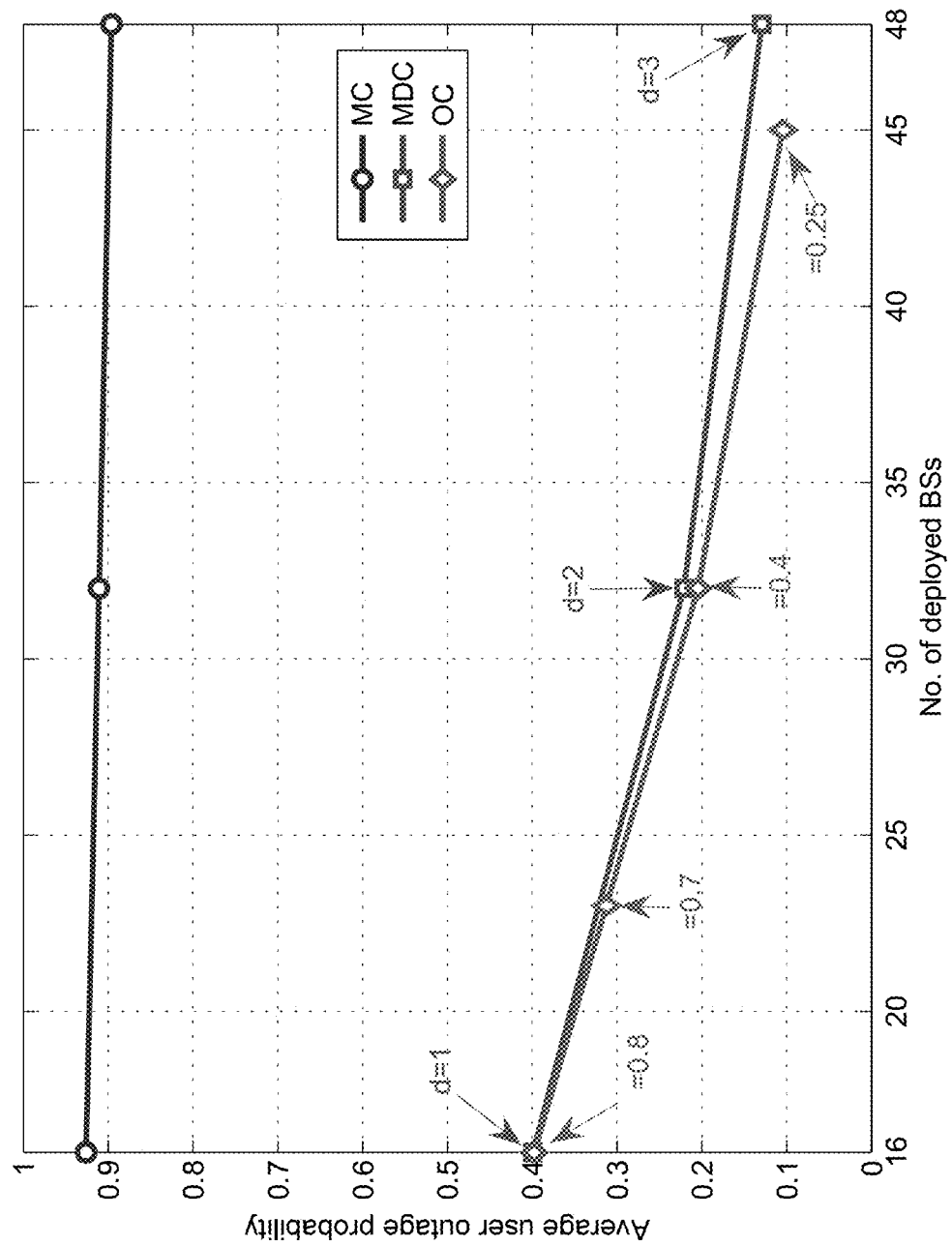
FIG. 3 is a graph showing the change in average user outage probability against different number of base stations for three different base station deployment techniques (known maximum coverage, macro diversity-constrained in one embodiment of the invention, and outage-constrained in one embodiment of the invention)

FIG. 3 shows the average user outage probabilities of the existing maximum coverage technique, the macro diversity-constrained technique in the above example, and the outage-constrained technique in the above example. Average user outage probability is the percentage of users who suffer from link outage. From FIG. 3 it can be observed that given the same number of deployed base stations, the macro diversity-constrained technique and the outage-constrained technique can achieve significantly reduced outage compared to the maximum coverage technique. This is because the maximum coverage base station deployment focuses only on maximizing the line-of-sight coverage. For example, the average user outage probability of the maximum coverage technique is high, up to 0.93 when the number of deployed base stations is 16 in FIG. 3. Increasing the number of deployed base stations may not greatly reduce user outage probability if only the maximum coverage is considered. On the other hand, both the macro diversity-constrained technique with d=1 and the outage-constrained technique with $\varepsilon$=0.8 achieve lower user outage, at about 0.4. Nevertheless, the outage 0.4 is high for communication systems. For example, exploiting macro diversity, i.e., d>1, for the macro diversity-constrained technique can reduce the user outage to 0.24, but at the price of employing 32 base stations. Further increasing d can suppress the user outage while deploying more base stations. The outage-constrained technique offers an alternative strategy to further reduce the outage. The macro diversity-constrained technique with d=2 and the outage-constrained technique with $\varepsilon$=0.4 deploy the same number of base stations, i.e., 32, while the outage-constrained technique achieves lower outage about 0.2. To further reduce user outage, the macro diversity-constrained technique has to increase d to 3 with 48 base stations, while the outage-constrained technique can tune the $\varepsilon$ with more flexibility. One important implication of FIG. 3 simply by increasing macro diversity (by adding more base stations) is not always the most efficient way to reduce outage.

Figure 4:
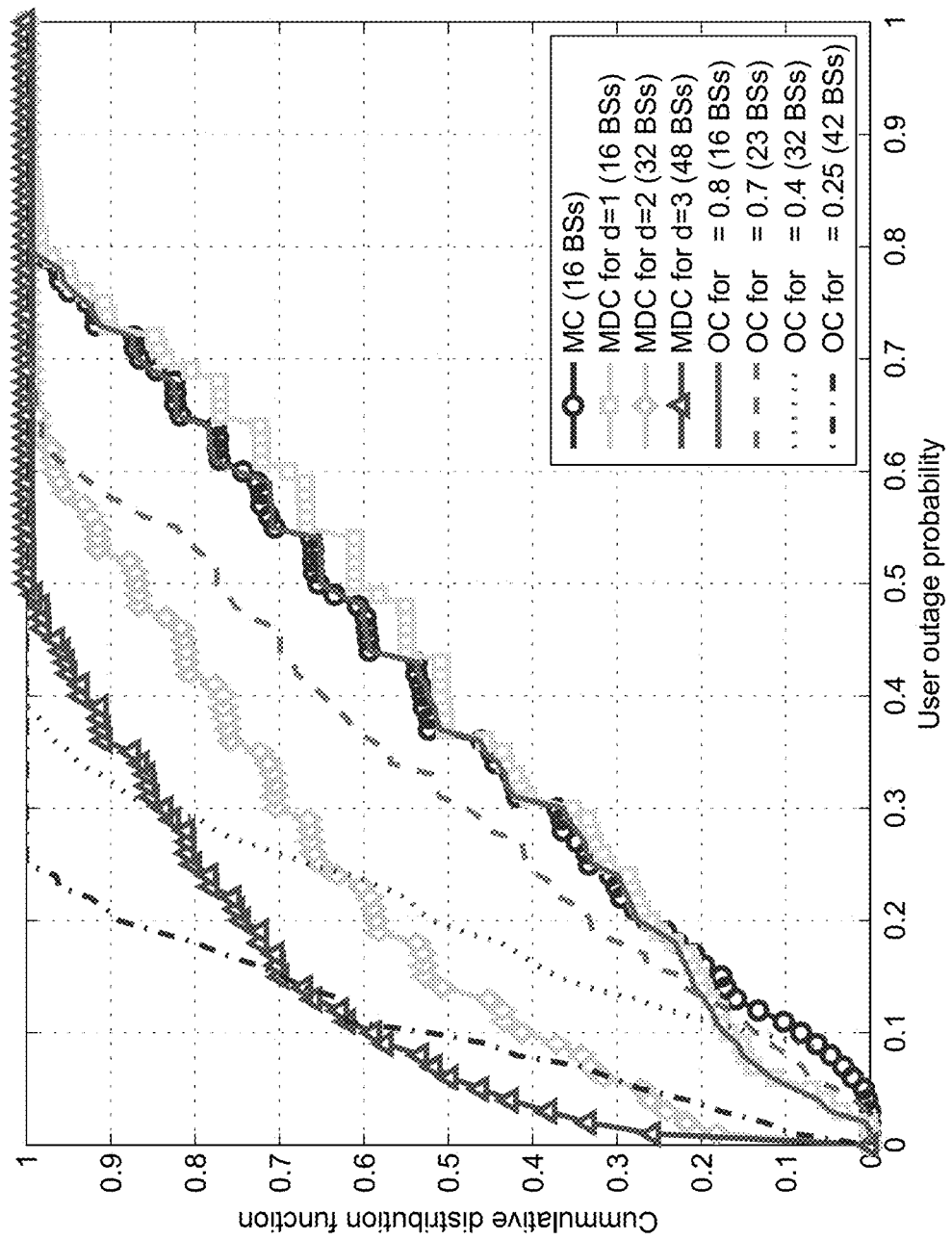
FIG. 4 is a graph showing the cumulative distribution function of user outage probability for three different base station deployment techniques (known maximum coverage, macro diversity-constrained in one embodiment of the invention, and outage-constrained in one embodiment of the invention)

FIG. 4 displays the cumulative distribution function of user outage probability. It is apparent that for the maximum coverage technique with 16 base stations, the macro diversity-constrained with d=1 (16 base stations) and the outage-constrained with $\varepsilon$=0.8 (16 base stations), there are half of users (user devices) whose outage probabilities are larger than 0.36. As seen from FIG. 4, for the macro diversity-constrained technique with 48 base stations, almost 90% users (user devices) have less than 0.35 outage probability, while the outage-constrained technique with 42 base stations, 90% users' (user devices) outage probabilities are less than 0.2. It is clear from FIG. 4 that the outage-constrained technique provides the user outage guarantee. For instance, when $\varepsilon$=0.7, $\varepsilon$=0.4, and $\varepsilon$=0.25 for the outage-constrained technique, the maximum user outage probabilities are, respectively, 0.31, 0.2, and 0.1, that are all below their corresponding $\varepsilon$ values. One important advantage of the outage-constrained technique is that its criterion provides the outage guarantee that can be parameterized by $\varepsilon$.

Figure 5B:
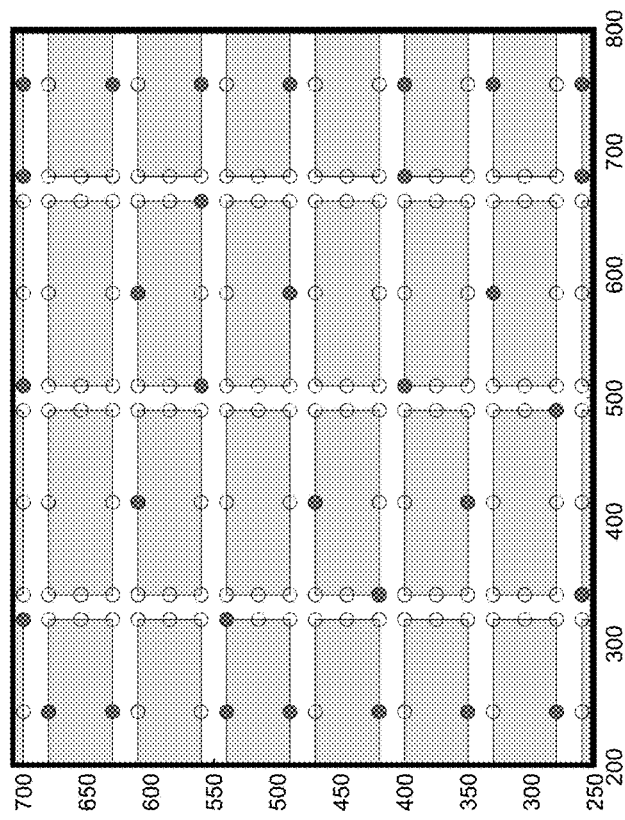
FIG. 5B is a schematic showing the installation locations of the wireless communication devices in the modelled terrain determined based on a outage-constrained in one embodiment of the invention.
Figure 5A:
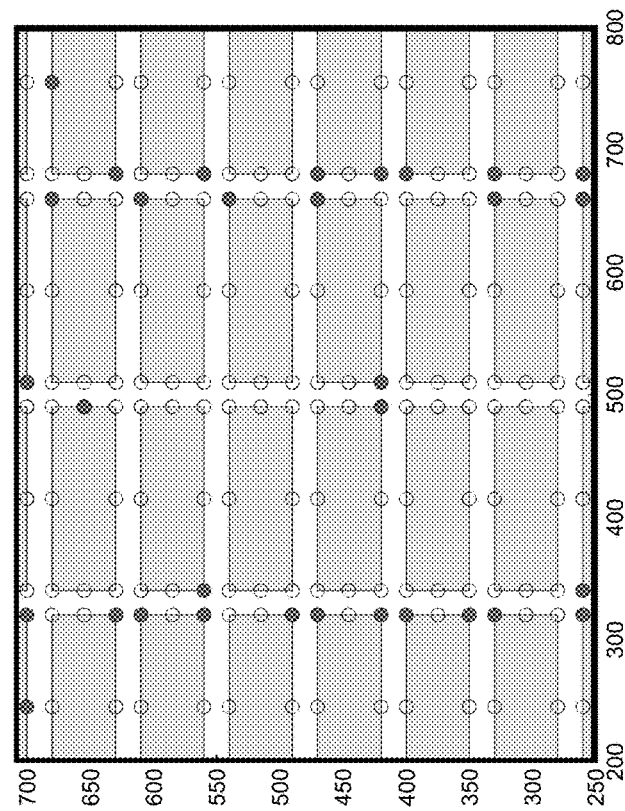
FIG. 5A is a schematic showing the installation locations of the wireless communication devices in the modelled terrain determined based on a macro diversity-constrained technique in one embodiment of the invention.

As shown in FIG. 4, the macro diversity-constrained technique with d=2 and the outage-constrained technique with $\varepsilon$=0.4 result in the 32 deployed base stations. FIGS. 5A and 5B show these two cases by displaying the determined, deployed or to-be-deployed base stations. In FIG. 5A, almost of the base stations deployed by the macro diversity-constrained technique are installed at the corners of each block. In FIG. 5B, the outage-constrained technique (FIG. 5B) evenly spreads the base stations in the Area of Interest 20. Placing base stations at the corners in FIG. 5A is a direct consequence of the macro diversity order constraint d=2. Inferior outage performance of the macro diversity-constrained technique compare with the outage-constrained technique can be explained by simply looking at FIGS. 5A and 5B. In FIG. 5A, some users are still far away from nearby base stations, experiencing a high chance of link outage due to the long distance. In FIG. 5B, the base station distribution strikes a compromise between the macro diversity and the average distance among base stations to users (user devices). This is possible because the outage probabilities in equations (3) and (4) are related to the distance $R_{ij}$.

The above embodiments of base station deployment techniques, i.e., the macro diversity-constrained technique and outage-constrained technique, can effectively alleviate user outage due to path blockage in the mmWave communication links. The macro diversity-constrained technique and outage-constrained technique minimize the number of deployed base stations with the constraints on the macro diversity order and the link outage at each grid, respectively. Both macro diversity-constrained and outage-constrained were formulated as the binary integer linear programming problems which can be optimally solved by using Branch-and-bound algorithm. Compared to existing methods such as the maximum coverage technique, the macro diversity-constrained technique and outage-constrained technique show great improvements (e.g., about 50%) on outage performance. Moreover, the outage-constrained technique provides the user outage guarantee and has lower average outage than the macro diversity-constrained technique. The threshold parameter in the outage-constrained can provide a performance-cost tradeoff between user outage and the number of deployed base stations, which is particularly useful for communication network design. Interestingly, as seen from the above, the outage-constrained technique may strike a compromise between the macro diversity and the average distance among base stations and users.

Referring to FIG. 6, there is shown a schematic diagram of an exemplary information handling system 200 that can be used to implement a method for determining a layout of a wireless communication network in one embodiment of the invention. The information handling system 200 may have different configurations, and it generally comprises suitable components necessary to receive, store, and execute appropriate computer instructions, commands, or codes. The main components of the information handling system 200 are a processor 202 and a memory unit 204. The processor 202 may be formed by one or more CPU, MCU, controllers, logic circuits, Raspberry Pi chip, etc. The processor 202 could be distributed across different devices. The memory unit 204 may include one or more volatile memory unit (such as RAM, DRAM, SRAM), one or more non-volatile unit (such as ROM, PROM, EPROM, EEPROM, FRAM, MRAM, FLASH, SSD, NAND, and NVDIMM), or any of their combinations. Preferably, the information handling system 200 further includes one or more input devices 206 such as a keyboard, a mouse, a stylus, an image scanner, a microphone, a tactile input device (e.g., touch sensitive screen), and an image/video input device (e.g., camera). The information handling system 200 may further include one or more output devices 208 such as one or more displays (e.g., monitor), speakers, disk drives, headphones, earphones, printers, 3D printers, etc. The display may include a LCD display, a LED/OLED display, or any other suitable display that may or may not be touch sensitive. The information handling system 200 may further include one or more disk drives 212 which may encompass solid state drives, hard disk drives, optical drives, flash drives, and/or magnetic tape drives. A suitable operating system may be installed in the information handling system 200, e.g., on the disk drive 212 or in the memory unit 204. The memory unit 204 and the disk drive 212 may be operated by the processor 202. The information handling system 200 also preferably includes a communication device 210 for establishing one or more communication links (not shown) with one or more other computing devices such as servers, personal computers, terminals, tablets, phones, or other wireless or handheld computing devices. The communication device 210 may be a modem, a Network Interface Card (NIC), an integrated network interface, a radio frequency transceiver, an optical port, an infrared port, a USB connection, or other wired or wireless communication interfaces. The communication links may be wired or wireless for communicating commands, instructions, information and/or data. Preferably, the processor 202, the memory unit 204, and optionally the input devices 206, the output devices 208, the communication device 210 and the disk drives 212 are connected with each other through a bus, a Peripheral Component Interconnect (PCI) such as PCI Express, a Universal Serial Bus (USB), an optical bus, or other like bus structure. In one embodiment, some of these components may be connected through a network such as the Internet or a cloud computing network. A person skilled in the art would appreciate that the information handling system 200 shown in FIG. 6 is merely exemplary and different information handling systems 200 with different configurations may be applicable in the invention. The information handling system 200 can be used, singly or in combination with other information handling systems, to implement the methods 100, 150.

Although not required, the embodiments described with reference to the Figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of the invention are either wholly implemented by computing system or partly implemented by computing systems then any appropriate computing system architecture may be utilized. This will include stand-alone computers, network computers, dedicated or non-dedicated hardware devices. Where the terms "computing system" and "computing device" are used, these terms are intended to include any appropriate arrangement of computer or information processing hardware capable of implementing the function described. The term "users" and "user devices", where appropriate, are used interchangeably to mean the same: a user holding a communication device and the communication device held by the user.

It will be appreciated by persons skilled in the art that numerous variations and/or modifications may be made to the invention as shown in the specific embodiments. The described embodiments of the invention should therefore be considered in all respects as illustrative, not restrictive.

For example, the methods of the invention can be applied not only to mmWave communication systems, but also other wireless communication systems. The terrain in which the wireless communication system is arranged or is to be arranged can be any terrain, urban or rural, indoors or outdoors. The macro diversity-constrained (MDC) deployment technique and outage-constrained (OC) deployment technique in the above embodiments may be applied to a modelled terrain. The method steps 102 and/or 108 in method 100 may be omitted in some embodiments.

The invention claimed is:

1. A method for determining a layout of a wireless communication network in a terrain, the wireless communication network comprising multiple base stations each arranged to communicate wirelessly with one or more external communication devices, the method comprising:
    obtaining a modelled terrain of the terrain, the modelled terrain being a computer simulation or computer model of the terrain and including a first type of area in which external communication devices can be located, and a second type of area representing obstacles arranged to affect communication between the base stations and the external communication device; and
    determining, using a processor, based on a criteria, respective installation locations of the base stations in the modelled terrain so as to determine a layout of the wireless communication network in the terrain.

2. The method of claim 1, modelling, using the processor, the terrain in which the base stations of the wireless communication network can be arranged, the modelling comprises
    determining the first type of area in which external communication devices can be located, and
    determining the second type of area representing obstacles arranged to affect communication between the base stations and the external communication device.

3. The method of claim 2, wherein modelling the terrain further comprises segmenting the first type of area into multiple grids and wherein the criteria is separately applied to each respective grid.

4. The method of claim 2, wherein the modelling further comprises determining candidate locations suitable for installing the base stations wherein each respective determined installation locations corresponds to a respective candidate location.

5. The method of claim 4, wherein determining respective installation locations of the base stations comprises determining, from the candidate locations and based on the criteria, the candidate locations that best match the criteria.

6. The method of claim 4, wherein the total number of candidate locations is larger than a set total number of base stations.

7. The method of claim 1, wherein the criteria comprises a coverage criteria that requires each of the first type of areas to be communicatively covered by a set number of base stations of the wireless communication network.

8. The method of claim 7, wherein the set number is fixed.

9. The method of claim 7, wherein the set number is adjustable.

10. The method of claim 9, further comprising adjusting, by the processor, the set number based on a user input.

11. The method of claim 1, wherein the criteria comprises an outage-constrained criteria that requires each of the first type of areas to have an outage probability less than a set threshold, wherein the outage represents a loss of communication between the wireless communication network and an external communication device in the terrain.

12. The method of claim 11, wherein the set threshold is fixed.

13. The method of claim 11, wherein the set threshold is adjustable.

14. The method of claim 13, further comprising adjusting, by the processor, the set threshold based on a user input.

15. The method of claim 11, wherein the criteria comprises the outage-constrained criteria, and determining respective installation locations of the base stations in the modelled terrain comprises:
determining a minimum number of base stations required for the outage probability at each of the first type of area to be less than a respective set threshold.

16. The method of claim 1, further comprising selecting, based on a user input and using the processor, from multiple predetermined criteria, a criteria to be used for determining the installation locations.

17. The method of claim 16, wherein the multiple predetermined criteria comprises:
a coverage criteria that requires each of the first type of areas to be communicatively covered by a set number of base stations of the wireless communication network; and
an outage-constrained criteria that requires each of the first type of areas to have an outage probability less than a set threshold, wherein the outage represents a loss of communication between the wireless communication network and an external communication device in the terrain.

18. The method of claim 1, wherein each base station is arranged to communicate with the external communication device via a direct non-reflected communication path and a first-order reflection communication path.

19. The method of claim 1, further comprising determining one or more direct non-reflected communication paths and one or more first-order reflection communication paths between each of the first type of area and the respectively base stations communicatively covering respective first type of area; wherein the determined direct non-reflected communication paths and first-order reflection communication paths are used at least in part for determining the installation locations.

20. The method of claim 1, further comprising:
displaying, on a display operably connected with the processor, the modelled terrain and indications indicating the determined installation locations on the modelled terrain.

21. The method of claim 20, wherein the external communication device is a portable electronic device.

22. The method of claim 1, wherein the wireless communication network is an mmWave communication network and the base stations are mmWave communication base stations.

23. A method for constructing a wireless communication network in a terrain, the wireless communication network comprising multiple base stations each arranged to communicate wirelessly with one or more external communication devices, the method comprising:
obtaining a modelled terrain of the terrain, the modelled terrain being a computer simulation or a computer model of the terrain and including a first type of area in which external communication devices can be located, and a second type of area representing obstacles arranged to affect communication between the base stations and the external communication device;
determining, using a processor, based on a criteria, respective installation locations of the base stations in the modelled terrain so as to determine a layout of the wireless communication network in the terrain; and
installing or constructing one or more base stations in the terrain based on the determined layout.

24. A system for determining a layout of a wireless communication network in a terrain, the wireless communication network comprising multiple base stations each arranged to communicate wirelessly with one or more external communication devices, the system comprising one or more processors arranged to:
determine, based on a criteria, respective installation locations of the base stations in a modelled terrain of the terrain so as to determine a layout of the wireless communication network in the terrain, wherein the modelled terrain is a computer simulation or a computer model of the terrain and includes:
a first type of area in which external communication devices can be located, and
a second type of area representing obstacles arranged to affect communication between the base stations and the external communication device.

* * * * *